(12) United States Patent
Rathore et al.

(10) Patent No.: US 10,889,691 B2
(45) Date of Patent: Jan. 12, 2021

(54) SILSESQUIOXANE POLYMERS, COMPOSITIONS, METHODS, AND ARTICLES

(71) Applicant: 3M INNOVATIVE PROPERTIES COMPANY, St. Paul, MN (US)

(72) Inventors: Jitendra S. Rathore, Woodbury, MN (US); Chetan P. Jariwala, Woodbury, MN (US); Lin Chen, St. Paul, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/640,998

(22) PCT Filed: Sep. 13, 2018

(86) PCT No.: PCT/IB2018/057022
§ 371 (c)(1),
(2) Date: Feb. 21, 2020

(87) PCT Pub. No.: WO2019/058228
PCT Pub. Date: Mar. 28, 2019

(65) Prior Publication Data
US 2020/0385531 A1    Dec. 10, 2020

Related U.S. Application Data

(60) Provisional application No. 62/561,867, filed on Sep. 22, 2017.

(51) Int. Cl.
| | | |
|---|---|---|
| C09D 183/08 | (2006.01) | |
| C08G 77/26 | (2006.01) | |
| C08G 77/18 | (2006.01) | |
| D06N 3/12 | (2006.01) | |

(52) U.S. Cl.
CPC ............ *C08G 77/26* (2013.01); *C08G 77/18* (2013.01); *C09D 183/08* (2013.01); *D06N 3/128* (2013.01); *D06M 2200/12* (2013.01)

(58) Field of Classification Search
CPC ........ C07F 7/18; C07F 7/1804; C07F 7/1896; C07F 7/12; B32B 27/283; C09D 183/04; C09D 183/08; D06M 15/643
See application file for complete search history.

(56) References Cited

U.S. PATENT DOCUMENTS

| | | |
|---|---|---|
| 7,482,419 B2 | 1/2009 | Caprasse |
| 9,273,163 B2 | 3/2016 | Crowther |
| 9,453,109 B2 | 9/2016 | Rtahore |
| 9,463,584 B2 | 10/2016 | Guha |
| 9,663,690 B2 | 5/2017 | Chatterjee |
| 2007/0026226 A1 | 2/2007 | Chen |
| 2009/0171014 A1 | 7/2009 | Hergenrother |
| 2011/0301254 A1 | 12/2011 | Knott |
| 2014/0088213 A1 | 3/2014 | Kulkarni |

(Continued)

FOREIGN PATENT DOCUMENTS

| | | |
|---|---|---|
| JP | 2006-219570 | 8/2006 |
| JP | 2013-237825 | 11/2013 |

(Continued)

OTHER PUBLICATIONS

AATCC Test Method 22-1996, "Water Repellency: Spray Test", Technical Manual of the American Association of Textile Chemists and Colorists, 2001, pp. 63-65.

Clarson, "Siloxane Polymer—Table of contents", Prentice Hall: Englewood Cliffs, 1993, 9pages.

Encyclopedia of Polymer Science and Engineering, Wiley-Interscience Publishers, New York, 1988, vol. 13, 3pages.

Kirk-Othmer, Encyclopedia of Polymer Science and Engineering, Wiley-Interscience Publication, 1989, vol. 15, Ed.2, pp. 235-243.

Noll, "Chemistry and Technology of Silicones", Academic Press, 1960, pp. 585-595.

Tomanek, "Silicones and Industry: A Compendium for Practical Use, Instruction, and Reference", Munich, 1990, 4pages.

(Continued)

*Primary Examiner* — Kuo Liang Peng
(74) *Attorney, Agent, or Firm* — Jean A. Lown (57) ABSTRACT

A silsesquioxane polymer, composition, method, and article including such polymer, wherein the polymer includes a three-dimensional network of Formula (I): wherein: each $R^1$ and $R^2$ is independently a (C1-C4)alkyl; each $L^1$ and $L^2$ is independently in a single bond, an alkylene, or an alkylene bonded to a group selected from oxy, thio, carbonyl, —NH—, and combinations thereof; each $R^3$ is independently a linear (C14-C100)alkyl; each $R^4$ is independently a (C1-C30)alkyl, (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group; with the proviso that $L^1$, $L^2$, and $R^4$ are selected such that each Si atom is directly bonded to an alkylene or an alkyl; m is an integer of at least 3; n is an integer of 0 or above; m+n is an integer of at least 3; each oxygen atom at an asterisk (*) is bonded to another Si atom within the three-dimensional network; and the silsesquioxane polymer is a solid at 25° C.

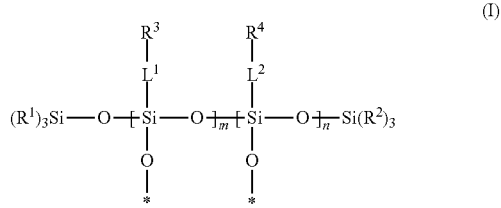

(I)

20 Claims, 1 Drawing Sheet

(56) References Cited

U.S. PATENT DOCUMENTS

| | | |
|---|---|---|
| 2015/0038037 A1 | 2/2015 | Coppens |
| 2015/0090160 A1 | 4/2015 | Taomoto |
| 2015/0126700 A1* | 5/2015 | Kamuro .................. C08L 83/04 528/31 |
| 2016/0024707 A1 | 1/2016 | Aydin |
| 2016/0319156 A1 | 11/2016 | Rathore |

FOREIGN PATENT DOCUMENTS

| | | |
|---|---|---|
| WO | WO 2013-162704 | 10/2013 |
| WO | WO 2014-074372 | 5/2014 |
| WO | WO 2014-099699 | 6/2014 |
| WO | WO 2014-139931 | 9/2014 |
| WO | WO 2016-133667 | 8/2016 |
| WO | WO 2019-058229 | 3/2019 |
| WO | WO 2019-058231 | 3/2019 |
| WO | WO 2019-058232 | 3/2019 |

OTHER PUBLICATIONS

Wilkinson, "Comprehensive Organometallic Chemistry", Pergamon Press, New York 1982, vol. 2, pp. 329-330.
International Search report for PCT International Application No. PCT/IB2018/057022 dated Nov. 22, 2018, 5 pages.

* cited by examiner

SILSESQUIOXANE POLYMERS, COMPOSITIONS, METHODS, AND ARTICLES

CROSS REFERENCE TO RELATED APPLICATION

This application is a national stage filing under 35 U.S.C. 371 pf PCT/IB2018/057022, filed Sep. 13,2018, which claims the benefit of U.S. Provisional Patent Application No. 62/561867, filed Sep. 22, 2017, the disclosure of which is incorporated by reference herein in its/their entirety.

BACKGROUND

A silsesquioxane is a compound with the empirical chemical formula $RSiO_{3/2}$ where Si is the element silicon, O is oxygen and R is an organic group. Silsesquioxane materials generally contain reactive silanol (Si—OH) moieties, which can condense over time or with the help of an acid/base catalyst leading to curing of the material. This curability of silsesquioxanes via silanol groups has been widely utilized to prepare solid films and patterns in photolithography. The presence of the silanol groups, however, can lead to materials having limited shelf-life and limited solubility. Also, the presence of residual acids or bases from curing mechanisms can cause corrosion. Thus, new silsesquioxane materials are desirable.

SUMMARY OF THE DISCLOSURE

The present disclosure provides silsesquioxane (SSQ) polymers, as well as compositions including such polymers, methods of using such polymers (e.g., to treat fibrous substrates), and articles including such polymers in hydrophobic layers.

In one embodiment, a silsesquioxane polymer includes a three-dimensional network of Formula wherein:
each $R^1$ and $R^2$ is independently a (C1-C4)alkyl;
each $L^1$ and $L^2$ is independently a single bond, an alkylene, or an alkylene bonded to a group selected from oxy, thio, carbonyl, —NH—, and combinations thereof;
each $R^3$ is independently a linear (C14-C100)alkyl;
each $R^4$ is independently a (C1-C30)alkyl, a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl;
m is an integer of at least 2;
n is an integer of 0 or above;
m+n is an integer of at least 3;

each oxygen atom at an asterisk (*) is bonded to another Si atom within the three-dimensional network; and
the silsesquioxane polymer is a sold at 25° C.

In another embodiment, an article is provided that includes: a substrate; and a hydrophobic layer including a silsesquioxane polymer of the present disclosure adjacent to the substrate.

In another embodiment, a coating composition (e.g., a treating composition, and preferably, an aqueous treating composition) is provided that includes a silsesquioxane polymer of the present disclosure. In another embodiment, a method of treating a fibrous substrate is provided that includes applying to the fibrous substrate a treating composition as described herein in an amount sufficient to make the fibrous substrate water repellent. In another embodiment, a fibrous substrate treated by such method is provided.

As used herein, "alkyl" refers to a monovalent group that is a radical of an alkane and includes straight-chain (i.e., linear), branched, cyclic, and bicyclic alkyl groups, and combinations thereof, including both unsubstituted and substituted alkyl groups. Unless otherwise indicated, the alkyl groups typically contain from 1 to 100 carbon atoms. In some embodiments, the alkyl groups contain 1 to 60 carbon atoms, 1 to 30 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 100 carbon atoms. In some embodiments, the alkylene group has 1 to 60 carbon atoms, 1 to 30 carbon atoms, 1 to 10 carbon atoms, 1 to 6 carbon atoms, or 1 to 4 carbon atoms. Examples of "alkylene" groups include methylene, ethylene, propylene, 1,4-butylene, 1,4-cyclohexylene, and 1,4-cyclohexyldimethylene.

The term "heteroalkyl" means an alkyl group having at least one —$CH_2$— replaced with a heteroatom such as —NH—, —O—, or —S—.

The term "carbonyl" means a divalent group of formula —C(O)—where the carbon atoms is bonded to the oxygen with a double bond.

The term "oxy" means a divalent group of formula —O—.

The term "thio" means a divalent group of formula —S—.

The term "hydroxyl" means a monovalent group of formula —OH.

The term "thiol" means a monovalent group of formula —SH.

The term "isocyanato" means a monovalent group of formula —N=C=O.

The term "cyanato" means a monovalent group of formula —CN.

The term "glycidoxy" (also known as glycidyloxy) means an oxiran-2-yl-methyloxy group of the formula:

wherein the (*) represents the point of attachment to a molecule. The term "epoxy" means an oxiranyl group of the formula:

wherein the (*) represents the point of attachment to a molecule.

The term "hydrophobic layer" means a layer on which a water droplet has a contact angle of at least 90 degrees.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" in dicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one L group is present in a formula, each L group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides silsesquioxane polymers as well as compositions including such polymers, methods of using such polymers (e.g., to treat fibrous substrates), and articles including such polymers in hydrophobic layers.

Figure 1:
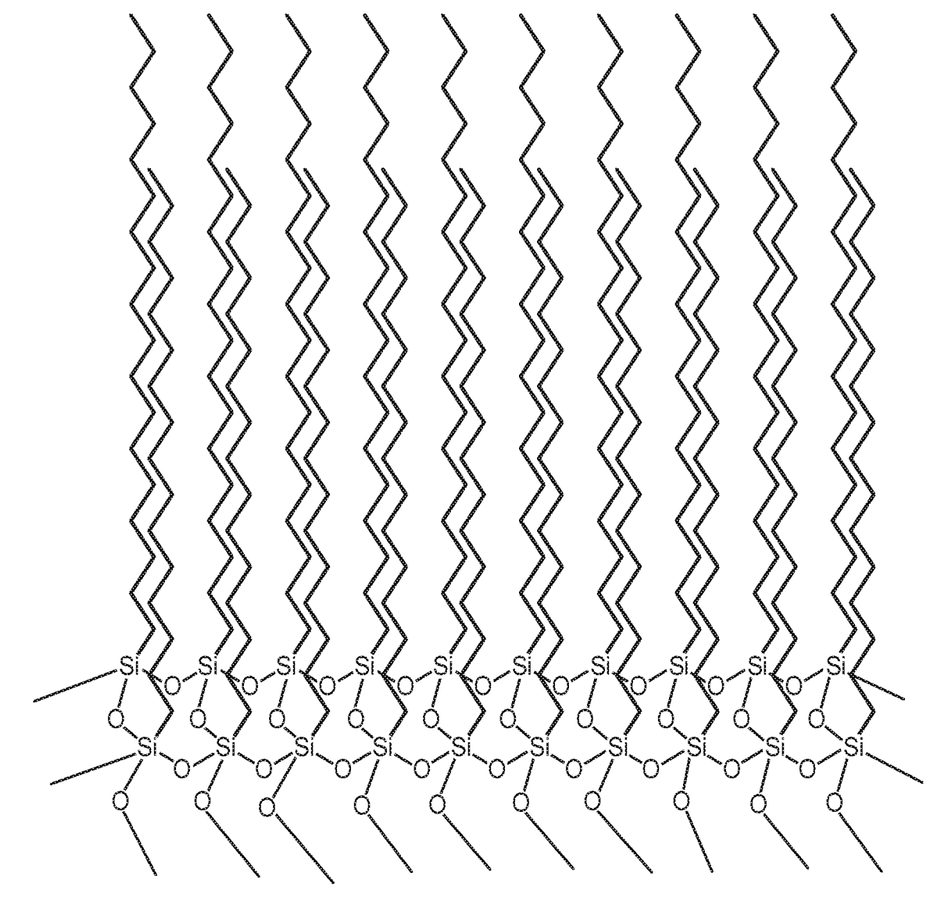
FIG. 1 is a schematic representation of co-crystallized hydrocarbon chains in a representative silsesquioxane polymer.

The silsesquioxane (SSQ) polymers of the present disclosure generally display excellent water repellent properties when applied to a substrate, whether it has a smooth or textured surface. The unique structure of the silsesquioxane polymers allows the hydrocarbon chains to co-crystallize (as shown in FIG. 1). As a result, they have superior water repellent properties (e.g., greater contact angles) compared to long-chain hydrocarbon compounds. See, for example, the water contact angles presented in Table 4 of the Examples Section. In particular, compare the water contact angles for Comparative Examples C1, C2, C3, and C5 for hydrocarbon compounds with chain lengths of 18 carbons, 16 carbons, 26 carbons, and 18 carbons with oxygen (octadecanol) to the water contact angles of Examples 1, 2, 3, and 5, respectively, for the corresponding SSQ polymers with the same hydrocarbon chain lengths (i.e., the corresponding SSQ polymers that include at least two $R^3$ groups having at least 14 carbons in the hydrocarbon groups). Also, the water contact angles for the SSQ polymers of the present disclosure, which include at least two $R^3$ groups having at least C14 hydrocarbon groups (in Examples 1-13), are greater than SSQ polymers having less than 14 carbon atoms in the hydrocarbon groups (in Comparative Examples 6-9).

The silsesquioxane polymers of the present disclosure also possess shelf stability. In this context, the polymers are completely soluble in heptane, methyl ethyl ketone, ethyl acetate, toluene, xylene, or a combination thereof, for at least 6 months, or at least 12 months.

In one embodiment, a silsesquioxane polymer is provided that is solid at 25° C. and includes a three-dimensional network of Formula (I):

wherein this structure indicates the building blocks of the polymer, and each oxygen atom at an asterisk (*) is bonded to another Si atom within the three-dimensional network of the polymer. In typical polymers, the —$L^1$-$R^3$-containing repeat units and the —$L^2$—$R^4$-containing units are randomly distributed in the polymers.

In Formula (I), each $R^1$ and $R^2$ is independently a (C1-C4)alkyl (e.g., a methyl group). In certain embodiments, each $R^1$ and $R^2$ is a methyl group.

In Formula (I), each $L^1$ and $L^2$ is independently a single bond, an alkylene, or an alkylene bonded to a group selected from oxy, thio, carbonyl, —NH—, and combinations thereof (e.g., carbonyloxy groups (—C(O)—O—) or carbonylamino groups (—C(O)—NH—)). Typically, in each of $L^1$ and $L^2$ there is only one of such group or combination thereof (e.g., only one oxy, thio, carbonyl, —NH—, carbonyloxy, or carbonylamino).

In certain embodiments, each $L^1$ is a single bond. In certain embodiments, at least a portion of the $L^1$ groups are single bonds, and at least a portion of the $L^1$ groups are an alkylene bonded to a group selected from oxy, thio, carbonyl, —NH—, and combinations thereof.

In certain embodiments, each $L^2$ is a single bond. In certain embodiments, at least a portion of the $L^2$ groups are an alkylene bonded to a group selected from oxy, thio, carbonyl, —NH—, and combinations thereof.

In Formula (I), each $R^3$ is independently a linear (C14-C100)alkyl. The alkyl group can have at least 14, at least 16, at least 18, at least 20, at least 24, or at least 30 carbon atoms and up to 100, up to 80, up to 60, up to 40, or up to 30 carbon atoms. In certain embodiments, each $R^3$ is independently a linear (C14-C60)alkyl. In certain embodiments, each $R^3$ is independently a linear (C16-C60)alkyl. In certain embodiments, each $R^3$ is independently a linear (C18-C30)alkyl.

In Formula (I), each $R^4$ is independently a (C1-C30)alkyl, a (C2-C30)heteroalkyl having at least one oxygen, sulfur, or —NH— group (in certain embodiments, multiples of such hetero groups are included), or a (C1-C30)alkyl substituted with a fluoro, thiol, isocyanato, cyanato, hydroxyl, glycidoxy, or epoxy group. Such groups may be nonreactive or reactive to allow, for example, bonding to a substrate. There can be at least 2, at least 3, at least 6, at least 10, at least 12 and up to 30, up to 24, up to 20, or up to 18 carbon atoms.

In certain embodiments, each $R^4$ is independently a (C1-C30)alkyl.

In certain embodiments, each $R^4$ is independently a (C2-C30)heteroalkyl having at least one oxygen, sulfur, or -NH- group, or a (C1-C30)alkyl substituted with a fluoro, thiol, isocyanato, cyanato, hydroxyl, glycidoxy, or epoxy group.

In certain embodiments, at least a portion of the $R^4$ groups are independently a (C1-C30)alkyl, and at least a portion of the $R^4$ groups are independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

In Formula (I), $L^1$, $L^2$, and $R^4$ are selected such that each Si atom is directly bonded to an alkylene or an alkyl.

In Formula (I), m is an integer of at least 2.

In Formula (I), n is an integer of 0 or above. In certain embodiments, n=0.

In Formula (I), m+n is an integer of at least 3. In certain embodiments, m+n is an integer of at least 25 (or at least 35, or at least 50, or at least 100). In certain embodiments, m+n is an integer of up to 600 (or up to 500, or up to 400, or up to 300, or up to 200, or up to 100, or up to 50).

In certain embodiments of Formula (I), m÷(m+n) is at least 0.50 (or at least 0.70, or at least 0.90). In certain embodiments of Formula (I), m÷(m+n) is up to 1.0.

In certain embodiments, the silsesquioxane polymer of the present disclosure has a (weight average) molecular weight of at least 1000 Daltons (i.e., grams/mole), at least 2000 Daltons, at least 5000 Daltons, or at least 10,000 Daltons. In certain embodiments, the silsesquioxane polymer of the present disclosure has a (weight average) molecular weight of up to 200,000 Daltons, up to 100,000 Daltons, or up to 50,000 Daltons, or up to 20,000 Daltons.

SSQ polymers of the present disclosure can be made using well-known techniques, as exemplified in the Examples Section. For example, SSQ polymers can be generally prepared by acid- or base-catalyzed hydrolysis and condensation of silanes that include at least three hydrolyzable groups, such as trialkoxysilane, trichlorosilanes, tribromosilanes, triiodosilanes, triacetoxysilanes, etc. Generally, the hydrolysis leads to the formation of reactive silanol groups, which condense together to form silicon-oxygen-silicon bonds. The residual silanol groups can further be capped with a capping agent (silane with one hydrolyzable group), such as trimethylethoxysilane, trimethylchlorosilane, trimethylchlorosilane, etc.

Coating (e.g., Treating) Compositions

The present disclosure provides a coating composition for application of a silsesquioxane polymer to a substrate surface. The SSQ polymers of the present disclosure generally display excellent water repellent properties when applied to a substrate. In certain embodiments, some SSQ polymers of the present disclosure can be used in treating compositions, typically aqueous treating compositions, particularly for fibrous substrates. Thus, the present disclosure provides coating compositions, particularly treating compositions, treated fibrous substrates, and treating methods.

In certain embodiments, such compositions are fluorine-free. Herein, a "fluorine-free" composition means that a composition includes less than 1 weight percent (1 wt-%) fluorine in a composition based on solids, whether in a concentrate or ready-to-use composition. In certain embodiments, a "fluorine-free" composition means that a composition includes less than 0.5 wt %, or less than 0.1 wt %, or less than 0.05 wt-%, or less than 0.01 wt-%, fluorine. The fluorine may be in the form of organic or inorganic fluorine-containing compounds.

Compositions of the present disclosure are useful for treating a fibrous substrate to enhance the substrate's water repellency. As used herein, a fibrous substrate is water repellent if it demonstrates a minimum initial spray rating of at least 50, as determined by the Spray Rating Test described in the Examples Section. In certain embodiments, the initial spray rating is at least 60, at least 70, at least 80, at least 90, or at least 100, as determined by the Spray Rating Test described in the Examples Section.

Typically, an SSQ polymer is selected, and an amount of the treating composition is used on a fibrous substrate, to obtain a desired initial spray rating level. In certain embodiments, the amount of treating composition is at least 0.1 weight percent (wt-%), or at least 0.2 wt-%, or at least 0.3 wt-%, or at least 0.4 wt-%, or at least 0.5 wt-%, or at least 0.6 wt-%, SOF (solids on fibrous substrate, e.g., fabric). In certain embodiments, the amount of treating composition is up to 2 wt-%, or up to 1.5 wt-%, or up to 1 wt-% SOF (solids on fibrous substrate, e.g., fabric).

Compositions of the present disclosure may be in the form of an aqueous concentrate, which may include up to 80 weight percent (wt-%) water, based on the total weight of the concentrated aqueous composition. Alternatively, compositions of the present disclosure may be in the form of a ready-to-use aqueous formulation, which may include more than 80 wt-% water, or at least 85 wt-% water, or at least 90 wt-% water, or at least 95 wt-% water, or at least 98 wt-% water, based on the total weight of the ready-to-use aqueous composition. In certain embodiments, a ready-to-use aqueous composition of the present disclosure includes up to 99 wt-% water, based on the total weight of the ready-to-use aqueous composition.

The SSQ polymers of the present disclosure may be dispersed in water using a surfactant or mixture of surfactants in an amount sufficient to stabilize the dispersion. If the SSQ polymers are made in solution in a solvent, it can be dispersed in water through vigorously mixing and homogenizing with the help of a surfactant or emulsifier and subsequent homogenization, for example, by a Manton Gaulin homogenizer or ultrasound homogenizer. An organic solvent-free dispersion can then be obtained by subsequent distillation of the solvent.

A typical dispersion will contain water in an amount of 70 to 20,000 parts by weight based on 100 parts by weight of SSQ polymer. The amount of water can be at least 70, at least 100, at least 200, at least 500, at least 1,000, at least 2,000, or at least 5,000 parts and up to 20,000 parts, up to 10,000 parts, up to 5,000 parts, up to 1,000 parts, or up to 500 parts by weight based on 100 parts by weight of SSQ polymer. In certain embodiments, the surfactant or mixture of surfactants is present in an amount of 1 to 25 parts by weight, 5 to 25 parts by weight, 1 to 15 parts, or 5 to 15 parts by weight, based on 100 parts by weight of SSQ polymer.

Compositions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodium dodecylbenzene sulphonate (available from Rhodia, France), and the like. Suitable amphoteric surfactants include cocobetaines, sulphobetaines, amine-oxides, and the like. In certain embodiments, surfactants suitable for use in the compositions of the present disclosure are described in International Publication No. WO 2013/162704 (Coppens et al.).

Also, compositions of the present disclosure may further include one or more of a coalescing solvent, an anti-freeze solvent, an emulsifier, or a stabilizer against one or more microorganisms. The amount of such compounds depends on the application, and can be readily determined by one of skill in the art.

A composition for application of a silsesquioxane polymer to a substrate surface can include water, as described above, and/or an organic solvent, if desired. Useful solvents for the coating compositions include those in which the SSQ polymer is soluble at the level desired. Typically, such organic solvent includes toluene, heptane, methyl ethyl ketone, ethyl acetate, and xylene. These solvents can be used alone or as mixtures thereof.

Any amount of organic solvent can be used. For example, a coating composition can include up to 50 wt-% or even more of organic solvent (e.g., up to 99 wt-%). The solvent can be added to provide the desired viscosity to the coating composition. In some embodiments, no solvent or only low levels (e.g., up to 10 wt-%) of organic solvent is used in a coating composition.

A coating composition typically has a viscosity appropriate to the application conditions and method. For example, a material to be brush or roller coated would likely be preferred to have a higher viscosity than a dip coating composition.

In certain embodiments, a coating composition includes at least 5 wt-% (or at least 10 wt-%, or at least 20 wt-%, or at least 30 wt-%), of the SSQ polymer, based on the total weight of the coating composition. In certain embodiments, a coating composition often includes no greater than 80 wt-% (or no greater than 70 wt-%, or no greater than 60 wt-%, or no greater than 50 wt-%), of the SSQ polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A coating composition of the present disclosure can be applied in a continuous or patterned layer. Such layer can be disposed on at least a portion of at least one surface of the substrate. If the composition includes an organic solvent, the coated composition can be exposed to conditions that allow the organic solvent to evaporate from the composition.

Articles

The present disclosure also provides an article that includes a substrate and a hydrophobic layer that includes a silsesquioxane polymer as described herein adjacent to the substrate. The present disclosure also provides a fibrous substrate treated with a treating composition that includes a silsesquioxane polymer as described herein.

The substrate may be a hard surface (e.g., floor), a film (e.g., PET film), or a fibrous substrate (e.g., nonwoven web), for example. Useful substrates include ceramics, siliceous substrates, including glass, metal, natural and man-made stone, and polymeric materials, including thermoplastics and thermosets. Exemplary fibrous substrates include textile, leather, carpet, paper, and fabrics (nonwoven, woven, or knitted). Suitable polymer materials (particularly for use in fibrous substrates) include, for example, polyester and nylon.

EXEMPLARY EMBODIMENTS

Embodiment 1 is a silsesquioxane polymer comprising a three-dimensional network of Formula (I):

wherein:
each $R^1$ and $R^2$ is independently a (C1-C4)alkyl;
each $L^1$ and $L^2$ is independently a single bond, an alkylene, or an alkylene bonded to a group selected from oxy, thio, carbonyl, —NH—, and combinations thereof;
each $R^3$ is independently a linear (C14-C100)alkyl;
each $R^4$ is independently a (C1-C30)alkyl, a (C2-C30) heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl;
m is an integer of at least 2;
n is an integer of 0 or above;
m+n is an integer of at least 3;
each oxygen atom at an asterisk (*) is bonded to another Si atom within the three-dimensional network; and
the silsesquioxane polymer is a solid at 25° C.

Embodiment 2 is the silsesquioxane polymer of embodiment 1 wherein m÷(m+n) is at least 0.50 (or at least 0.70, or at least 0.90).

Embodiment 3 is the silsesquioxane polymer of embodiment 1 or 2 wherein m÷(m+n) is up to 1.0.

Embodiment 4 is the silsesquioxane polymer of any one of embodiments 1 through 3 wherein each $R^3$ is independently a linear (C14-C60)alkyl.

Embodiment 5 is the silsesquioxane polymer of embodiment 4 wherein each $R^3$ is independently a linear (C16-C60) alkyl.

Embodiment 6 is the silsesquioxane polymer of embodiment 5 wherein each $R^3$ is independently a linear (C18-C30) alkyl.

Embodiment 7 is the silsesquioxane polymer of any one of embodiments 1 through 6 wherein each $L^1$ is a single bond.

Embodiment 8 is the silsesquioxane polymer of any one of embodiments 1 through 6 wherein at least a portion of the $L^1$ groups are single bonds, and at least a portion of the $L^1$ groups are an alkylene bonded to a group selected from oxy, thio, carbonyl, —NH—, and combinations thereof.

Embodiment 9 is the silsesquioxane polymer of any one of embodiments 1 through 8 wherein each $L^2$ is a single bond.

Embodiment 10 is the silsesquioxane polymer of any one of embodiments 1 through 8 wherein at least a portion of the $L^2$ groups are single bonds, and at least a portion of the $L^2$ groups are an alkylene bonded to a group selected from oxy, thio, carbonyl, —NH—, and combinations thereof.

Embodiment 11 is the silsesquioxane polymer of any one of embodiments 1 through 10 wherein each $R^4$ is independently a (C1-C30)alkyl.

Embodiment 12 is the silsesquioxane polymer of any one of embodiments 1 through 10 wherein each $R^4$ is independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

Embodiment 13 is the silsesquioxane polymer of any one of embodiments 1 through 10 wherein at least a portion of the $R^4$ groups are independently a (C1-C30)alkyl, and at least a portion of the $R^4$ groups are independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

Embodiment 14 is the silsesquioxane polymer of any one of embodiments 1 through 13 wherein each $R^1$ and $R^2$ is a methyl group.

Embodiment 15 is the silsesquioxane polymer of any one of embodiments 1 through 14 wherein n=0.

Embodiment 16 is the silsesquioxane polymer of any one of embodiments 1 through 15 wherein m+n is an integer of at least 25 (or at least 35).

Embodiment 17 is the silsesquioxane polymer of any one of embodiments 1 through 16 wherein m+n is an integer of up to 600 (or up to 500, or up to 400, or up to 300, or up to 200, or up to 100, or up to 50).

Embodiment 18 is the silsesquioxane polymer of any one of embodiments 1 through 17 which has a (weight average) molecular weight of at least 1000 Daltons (or at least 2000 Daltons, or at least 10,000 Daltons).

Embodiment 19 is the silsesquioxane polymer of any one of embodiments 1 through 18 which has a (weight average) molecular weight of up to 200,000 Daltons (or up to 100,000 Daltons, or up to 20,000 Daltons).

Embodiment 20 is an article comprising: a substrate; and a hydrophobic layer comprising a silsesquioxane polymer of any one of embodiments 1 through 19 adjacent to the substrate.

Embodiment 21 is the article of embodiment 20 wherein the substrate is a hard surface (e.g., floor).

Embodiment 22 is the article of embodiment 20 wherein the substrate is a film (e.g., PET film). Embodiment 23 is the article of embodiment 20 wherein the substrate is a fibrous substrate (e.g., nonwoven).

Embodiment 24 is a composition (particularly a treating composition) comprising a silsesquioxane polymer of any one of embodiments 1 through 19.

Embodiment 25 is the composition of embodiment 24 which is an aqueous treating composition comprising water, and in certain embodiments, an aqueous fluorine-free treating composition.

Embodiment 26 is the composition of embodiments 24 or 25 wherein the composition further comprises one or more surfactants.

Embodiment 27 is the composition of any one of embodiments 24 through 26 wherein the composition further comprises one or more additives selected from a surfactant, a coalescing solvent, an anti-freeze solvent, an emulsifier, and a stabilizer against one or more microorganisms.

Embodiment 28 is a method of treating a fibrous substrate comprising applying to the fibrous substrate a treating composition of any one of embodiments 24 through 27 in an amount sufficient to make the fibrous substrate water repellent.

Embodiment 29 is a fibrous substrate treated by the method of embodiment 28.

Embodiment 30 is the fibrous substrate of embodiment 29 which is selected from the group of textile, leather, carpet, paper, and fabrics (nonwoven, woven, or knitted).

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples are by weight. Unless otherwise specified, all reagents used in the examples were obtained, or are available, from general chemical suppliers such as, for example, Sigma Aldrich Company, Saint Louis, Mo., or may be synthesized by conventional methods.

| Materials Description |
|---|
| Octadecyltrimethoxysilane, having a melting point of 13-17° C., a boiling point of 170° C. at 0.1 millimeter Hg, and a molecular weight of 375 grams/mole, available under the product code SIO6645.0 from Gelest, Incorporated, Morrisville, PA. |
| Hexadecyltrimethoxysilane, 95%, having a melting point of −1° C., a boiling point of 155° C. at 0.2 millimeters Hg, and a molecular weight of 347 grams/mole, available under the product code SIH5925.0 from Gelest, Incorporated, Morrisville, PA. |
| Dodecyltrimethoxysilane, greater than (>) 95%, having a melting point of −24° C., a boiling point of 110° C. at 1.0 millimeter Hg, and a molecular weight of 291 grams/mole, available under the product code SID4635.0 from Gelest, Incorporated, Morrisville, PA. |
| Trimethylethoxysilane, >95%, having a freezing point of −83° C., a boiling point of 75° C., and a molecular weight of 118 grams/mole, available under the product code SIT8515.0 from Gelest, Incorporated, Morrisville, PA. |
| Triethoxysilane, 95-100%, having a melting point of −170° C., a boiling point of 131° C., and a molecular weight of 164 grams/mole, available under the product code SIT8185.0 from Gelest, Incorporated, Morrisville, PA. |
| 3,3,3-Perfluoropropyltrimethoxysilane, 98%, having a boiling point of 144° C. and a molecular weight of 218 grams/mole, available under the product code SIT8372.0 from Gelest, Incorporated, Morrisville, PA. |
| Methyltrimethoxysilane, 96%, having a melting point of −78° C., a boiling point of 102° C., and a molecular weight of 136 grams/mole, available under the product code SIM6560.0 from Gelest, Incorporated, Morrisville, PA. |
| n-Octyltrimethoxysilane, 95%, having a boiling point of 191° C. and a molecular weight of 234 grams/mole, available under the product code SIO6715.5 from Gelest, Incorporated, Morrisville, PA. |
| Methoxytriethyleneoxypropyltrimethoxysilane, >95%, having a boiling point of 140° C. at 0.2 millimeters Hg and a molecular weight of 326 grams/mole, available under the product code SIM6493.4 from Gelest, Incorporated, Morrisville, PA. |
| 3-Isocyanatopropyltrimethoxysilane, 95%, having a boiling point of 130° C. at 20 millimeters Hg and a molecular weight of 247 grams/mole, available under the product code SII6455.0 from Gelest, Incorporated, Morrisville, PA. |
| 3-Mercaptopropyltrimethoxysilane, >96%, having a boiling point of 93° C. at 40 millimeters Hg and a molecular weight of 196 grams/mole, available under the product code SIM6476.0 from Gelest, Incorporated, Morrisville, PA. |
| 3-Glycidoxypropyltrimethoxysilane, 97-100%, having a melting point of −70° C., a boiling point of 120° C. at 2 millimeters Hg, and a molecular weight of 236 grams/mole, available under the product code SIG5840.0 from Gelest, Incorporated, Morrisville, PA. |
| Aminopropyltrimethoxysilane, 97%, having a boiling point of 122° C. at 30 millimeters Hg and a molecular weight of 221 grams/mole, available under the product code SIA0611.0 from Gelest, Incorporated, Morrisville, PA. |

| Materials | Description |
|---|---|
| | Karstedt's Catalyst: a platinum-divinyltetramethyldisiloxane complex in xylene, containing between 2.1 and 2.4 weight percent (wt-%) platinum concentration (concentration of pure platinum metal), available under the product code SIP6831.2 from Gelest, Morrisville, PA. |
| | 1-Octadecanol, 95%, having a melting point of 56-59° C., a boiling point of 210° C. at15 millimeters Hg, and a molecular weight of 270 grams/mole, available under the product code 0709 from Sigma Aldrich Corporation, St. Louis, MO. |
| | ALPHAPLUS C30 + HA, a mixture of alpha olefins containing at least 95.5 wt-% of olefins having a carbon number of C30 or more, with an average molecular weight of 485 grams/mole, available under the trade designation ALPHAPLUS C30 + HA from Chevron Phillips Chemical Company LP, The Woodlands, TX. |
| | ALPHAPLUS C26-28, alpha olefins containing about 58 wt-% of olefins having a carbon number of C26 and about 40 weight % of olefins having a carbon number of C28, and having an average molecular weight of 378 grams/mole, available under the trade designation ALPHAPLUS C26-28 from Chevron Phillips Chemical Company LP, The Woodlands, TX. |
| | Dibutyltin dilaurate, available under the product code 291234 from Sigma Aldrich Corporation, St. Louis, MO. |
| | Dodecane, having a molecular weight of 170 grams/mole, a melting point of −10° C., and a boiling point of 216° C., available from Sigma Aldrich Corporation, St. Louis, MO. |
| | Hexadecane, having a molecular weight of 226 grams/mole, a melting point of 18° C., and a boiling point of 287° C., available from Sigma Aldrich Corporation, St. Louis, MO. |
| | Octadecane, having a molecular weight of 254 grams/mole and a melting point of 26° C. to 29° C., available from Sigma Aldrich Corporation, St. Louis, MO. |
| | Hexacosane, having a molecular weight of 367 grams/mole and a melting point of −55° C. to 58° C., available from Sigma Aldrich Corporation, St. Louis, MO. |
| | ETHOQUAD C-12, quarternized coco amine ethoxylate emulsifier (75-78% solids), available from Akzo Nobel, Stenungsund, Sweden. |
| | TERGITOL TMN-6, trimethyl nonane polyethylene nonionic surfactant, 90% active in water, available from Dow Chemical Company, Midland, MI. |
| | TERGITOL 15-S-30, alkyl polyoxyethylene nonionic surfactant, available from Dow Chemical Company, Midland, MI. |
| | Taslan Dobby woven nylon fabric (NTD), having a basis weight of 115 g/m². The nylon fabric is characterized by the Chinese manufacturer as 70D*160D/166T*83T, dyed and prepared for finishing. |
| | Poly Pongee woven polyester fabric (PPP), having a basis weight of 84 g/m². The polyester fabric is characterized by the Chinese manufacturer as 75D*75D/145T*90T, dyed and prepared for finishing. |

Test Methods

Gel Permeation Chromatography (GPC)

Molecular weights and polydispersity were determined at 23° C. by gel permeation chromatography (GPC) using a Model AGILENT 1100 Series LC SYSTEM (Agilent Technologies, Santa Clara, Calif.) equipped with a JORDI Gel DVB (Divinyl Benzene) MB-LS (Mixed Bed-Light Scattering) 250 millimeter (length)×10 millimeter I.D. (Inside Diameter) column set, in combination with a Model WYATT REX DIFFERENTIAL REFRACTIVE INDEX DETECTOR and a Model WYATT HELEOS II 18 ANGLE STATIC LIGHT SCATTERING DETECTOR (Wyatt Technology Corporation, Santa Barbara, Calif.). Sample solutions were prepared by adding 10 milliliters of tetrahydrofuran (THF) to a sample weighing between approximately 50 and 100 milligrams, and mixing for at least 14 hours followed by filtering through a 0.2 micrometer polytetrafluoroethylene syringe filter. The injection volume was 60 microliters and the THF eluent flow rate was 1.0 milliliter/minute. Duplicate solutions were run. The results were analyzed using Wyatt ASTRA software, Version 5.3. Weight and Number Average Molecular Weights (Mw and Mn) were reported in grams/mole, along with polydispersity D (Mw/Mn).

Contact Angle

All of the materials were coated out of toluene solution at 5 wt-% solids using #6 Mayer rod onto the primed side of 0.002 inch (0.05 millimeter) thick polyester film (Mitsubishi HOSTAPHAN 3SAB available from Mitsubishi Polyester Film, Incorporated, Greer, S.C.). The coated films were dried at 80° C. for 2 minutes in a forced air oven. Static contact angle measurements were made as soon as the samples had cooled to room temperature (20-25° C.) using a Model S/N VCA OPTIMA Instrument (from AST Product Incorporated, Billerica, MA). The contact angles were measured automatically with AutoFAST IMAGING SOFTWARE. A single measurement was made for each sample. A larger contact angle value indicates the material being evaluated has a greater degree of hydrophobicity.

Spray Rating (SR)

The spray rating of a treated fabric substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and is expressed in terms of a 'spray rating' of the tested substrate. The spray rating was obtained by spraying 250 milliliters water on the substrate from a height of 15 centimeters. The wetting pattern was visually rated using a 0 to 100 scale, where 0 means complete wetting and 100 means no wetting at all.

Treatment Procedure via "Padding" Process

The treatments were applied onto the fabric substrates, by immersing the substrates in the treatment dispersion and agitating until the substrate was saturated. The saturated substrate was then run through a padder/roller to remove excess of the dispersion and to obtain a certain % Wet Pick Up (WPU) (100% WPU means that after this process the substrate absorbed 100% of its own weight of the treatment dispersion before drying). Drying was carried out as indicated in the Examples.

Preparative Examples

Preparation of C30+ Adduct of Triethoxysilane

ALPHAPLUS C30+ HA, 121 grams, was added at room temperature to a 500-milliliter round bottom flask equipped with a condenser and heated at 100° C. for one hour. Next, a mixture of 45 grams triethoxysilane and 0.121 gram of Karstedt's Catalyst was added to the flask at 100° C. followed by stirring for twelve hours. The reaction was monitored by FT-IR until the Si—H absorbance disappeared. The reaction mixture was then vacuum stripped at 100° C. for one hour to give 152 grams (93% yield) an off-white solid product which was the C30+ adduct of triethoxysilane.

Preparation of C26-28 Adduct of Triethoxysilane

ALPHAPLUS C26-28, 126 grams, was added at room temperature to a 500-milliliter round bottom flask equipped with a condenser and heated at 90° C. for one hour. Next, a mixture of 60 grams triethoxysilane and 0.121 gram of Karstedt's Catalyst was added to the flask at 90° C. followed by stirring for twelve hours. The reaction mixture was then vacuum stripped at 90° C. for one hour to give 165 grams (93% yield) of an off-white solid product which was the C26-28 adduct of triethoxysilane.

Preparation of Octadecylcarbamatopropyltriethoxysilane

The following were mixed together at room temperature in a 500-milliliter round bottom flask equipped with a condenser: 135 grams of 1-octadecanol, 123.5 grams of isocyanatopropyltriethoxysilane, and 0.3 gram dibutyltin dilaurate followed by magnetic stirring at 90° C. for six hours. Octadecylcarbamatopropyltriethoxysilane, 236 grams (99% yield), was obtained as pale yellow viscous liquid.

EXAMPLES

Example 1 (SSQ-1)

The following were mixed together at room temperature in a 500-milliliter round bottom flask equipped with a condenser: 100 grams of octadecyl-trimethoxysilane, 100 grams of deionized water containing 1 part hydrochloric acid per 1000 parts water, and 200 grams of isopropyl alcohol. The mixture was heated at 70° C. and stirred with a magnet for two hours followed by the addition of 20 grams of trimethylethoxysilane. Next, the reaction mixture was stirred for three hours to give a white precipitate. The white precipitate was collected by filtering the mixture through a 240 milllimeter diameter, GRADE 1 (11 micrometer), WHATMAN QUALITATIVE FILTER PAPER then washing the precipitate with 500 milliliters of distilled water followed by drying using a vacuum pump at 70° C. for two hours to give 96.0 grams (96% yield) of a white solid, octadecyl silsesquioxane polymer, having a melting point of 45° C. and designated herein as SSQ-1 (Formula (I), $L^1=L^2$=single bond; $R^1=R^2$=methyl; $R^3=R^4$=C18 alkyl; m=18; and n=0). Contact angles were measured and are reported in Table 4 below. The product was also analyzed by gel permeation chromatography (GPC) to obtain the results shown in Table 1.

TABLE 1

| $M_n$ (grams/mole) | $M_w$ (grams/mole) | D |
|---|---|---|
| 5,050 | 5,720 | 1.13 |

Example 2 (SSQ-2)

Hexadecyl silsesquioxane polymer was prepared in the same manner as SSQ-1 with the following modification: hexadecyltrimethoxysilane, 100 grams, was used in place of octadecyl-trimethoxysilane to provide 95.0 grams (95% yield) of a white solid, hexadecyl silsesquioxane polymer, having a melting point of 42° C., designated herein as SSQ-2 (Formula (I), $L^1=L^2$=single bond; $R^1=R^2$=methyl; $R^3=R^4$=C16 alkyl; m=35; and n=0). Contact angles were measured and are reported in Table 4 below. The product was also analyzed by gel permeation chromatography (GPC) to obtain the results shown in Table 2.

TABLE 2

| $M_n$ (grams/mole) | $M_w$ (grams/mole) | D |
|---|---|---|
| 7,040 | 10,400 | 1.48 |

Example 3 (SSQ-3)

C26-28 silsesquioxane polymer was prepared in the same manner as SSQ-1 with the following modification: C26-28 Adduct of Triethoxysilane, 100 grams, prepared as described above, was used in place of octadecyl-trimethoxysilane to provide 97.0 grams (97% yield) of a white solid, C26-28 silsesquioxane polymer, designated herein as SSQ-3 (Formula (I), $L^1=L^2$=single bond; $R^1=R^2$=methyl; $R^3=R^4$=C26-C28 alkyl (mixture); m=15; and n=0). Contact angles were measured and are reported in Table 4 below.

Example 4 (SSQ-4)

C30+ silsesquioxane polymer was prepared in the same manner as SSQ-1 with the following modification: C30+ Adduct of Triethoxysilane, 100 grams, prepared as described above, was used in place of octadecyl-trimethoxysilane to provide 95.0 grams (95% yield) of a white solid, C30+ silsesquioxane polymer, designated herein as SSQ-4 (Formula (I), $L^1=L^2$=single bond; $R^1=R^2$=methyl; $R^3=R^4$=C30+ alkyl (mixture); m and n not determined). Contact angles were measured and are reported in Table 4 below.

Example 5 (SSQ-5)

Octadecylcarbamatopropyl silsesquioxane polymer was prepared in the same manner as SSQ-1 with the following modification: octadecylcarbamatopropyltriethoxysilane, 100 grams, prepared as described above, was used in place of octadecyl-trimethoxysilane to provide 95.0 grams (95% yield) of a pale-yellow solid, octadecylcarbamatopropyl silsesquioxane polymer, designated herein as SSQ-5 (Formula (I), $L^1=L^2$=—$(CH_2)_p$NHC(O)O— wherein p=3; $R^1=R^2$=methyl; $R^3=R^4$=C18 alkyl; m and n not determined). Contact angles were measured and are reported in Table 4 below.

Example 6 (SSQ-6)

The following were mixed together at room temperature in a 500-milliliter round bottom flask equipped with a condenser: 100 grams of octadecyl-trimethoxysilane, 20 grams of 3,3,3-perfluoropropyltrimethoxysilane, 100 grams of deionized water containing 1 part hydrochloric acid per 1000 parts water, and 200 grams of isopropyl alcohol. The mixture was heated at 70° C. and stirred with a magnet for two hours followed by the addition of 20 grams of trimethylethoxysilane. Next, the reaction mixture was stirred for three hours to give a white precipitate. The white precipitate was collected by filtering and drying the mixture as described in the Preparation of Octadecyl Silsesquioxane (SSQ-1) to give 108.0 grams (90% yield) of a white solid, octadecyl-co-perfluoropropyl silsesquioxane polymer, designated herein as SSQ-6 (Formula (I), $L^1$=single bond; $L^2$=—$(CH_2)_3$—; $R^1$=$R^2$=methyl; $R^3$ =C18 alkyl; $R^4$=—$CF_3$; m and n not determined). Contact angles were measured and are reported in Table 4 below.

Example 7 (SSQ-7)

Octadecyl-co-methyl silsesquioxane polymer was prepared in the same manner as SSQ-6 with the following modification: methyltrimethoxysilane, 20 grams, was used in place of 3,3,3-perfluoropropyltrimethoxysilane to provide 108.0 grams (90% yield) of a white solid, octadecyl-co-methyl silsesquioxane polymer, designated herein as SSQ-7 (Formula (I), $L^1$=$L^2$=single bond; $R^1$=$R^2$=methyl; $R^3$=C18 alkyl; $R^4$=$CH_3$; m and n not determined). Contact angles were measured and are reported in Table 4 below.

Example 8 (SSQ-8)

Octadecyl-co-octyl silsesquioxane polymer was prepared in the same manner as SSQ-6 with the following modification: n-octyl-trimethoxysilane, 20 grams, was used in place of 3,3,3-perfluoropropyltrimethoxysilane to provide 110.4 grams (92% yield) of a white solid, octadecyl-co-octyl silsesquioxane polymer, designated herein as SSQ-8 (Formula (I), $L^1$=$L^2$=single bond; $R^1$=$R^2$=methyl; $R^3$=C18 alkyl; $R^4$=—$(CH_2)_7CH_3$; m and n not determined). Contact angles were measured and are reported in Table 4 below.

Example 9 (SSQ-9)

Octadecyl-co-methoxytriethyleneoxypropyl silsesquioxane polymer was prepared in the same manner as SSQ-6 with the following modification: methoxytriethyleneoxypropyltrimethoxysilane, 5 grams, was used in place of 3,3,3-perfluoropropyltrimethoxysilane to provide 99.75 grams (95% yield) of a white solid, octadecyl-co-methoxytriethyleneoxypropyl silsesquioxane polymer, designated herein as SSQ-9 (Formula (I), $L^1$=$L^2$ =single bond; $R^1$=$R^2$=methyl; $R^3$=C18 alkyl; $R^4$=—$(CH_2)_3(CH_2CH_2O)_3OCH_3$; m and n not determined). Contact angles were measured and are reported in Table 4 below.

Example 10 (SSQ-10)

Octadecyl-co-isocyanatopropyl silsesquioxane polymer was prepared in the same manner as SSQ-6 with the following modification: 3-isocyanatopropyltrimethoxysilane, 10 grams, was used in place of 3,3,3-perfluoropropyltrimethoxysilane to provide 104.5 grams (95% yield) of a white solid, octadecyl-co-isocyanatopropyl silsesquioxane polymer, designated herein as SSQ-10 (Formula (I), $L^1$=$L^2$=single bond; $R^1$=$R^2$=methyl; $R^3$=C18 alkyl; $R^4$=—$(CH_2)_3NC(O)$; m and n not determined). Contact angles were measured and are reported in Table 4 below.

Example 11 (SSQ-11)

Octadecyl-co-mercaptopropyl silsesquioxane polymer was prepared in the same manner as SSQ-6 with the following modification: 3-mercaptopropyltrimethoxysilane, 20 grams, was used in place of 3,3,3-perfluoropropyltrimethoxysilane to provide 108.0 grams (95% yield) of a white solid, octadecyl-co-mercaptopropyl silsesquioxane polymer, designated herein as SSQ-11 (Formula (I), $L^1$=$L^2$=single bond; $R^1$=$R^2$=methyl; $R^3$=C18 alkyl; $R^4$=—$(CH_2)_3SH$; m and n not determined). Contact angles were measured and are reported in Table 4 below.

Example 12 (SSQ-12)

Octadecyl-co-glycidoxypropyl silsesquioxane polymer was prepared in the same manner as SSQ-6 with the following modification: 3-glycidoxypropyltrimethoxysilane, 10 grams, was used in place of 3,3,3-perfluoropropyltrimethoxysilane to provide 104.5 grams (95% yield) of a white solid, octadecyl-co-glycidoxypropyl silsesquioxane polymer, designated herein as SSQ-12 (Formula (I), $L^1$=single bond; $L^2$=—$(CH_2)_3$—; $R^1$=$R^2$=methyl; $R^3$=C18 alkyl;

$R^4 = $  —$(CH_2)_3O$—;

m and n not determined). Contact angles were measured and are reported in Table 4 below.

Example 13 (SSQ-13)

Octadecyl-co-aminopropyl silsesquioxane polymer was prepared in the same manner as SSQ-6 with the following modification: aminopropyltrimethoxysilane, 10 grams, was used in place of 3,3,3-perfluoropropyltrimethoxysilane to provide 104.5 grams (95% yield) of a white solid, octadecyl-co-aminopropyl silsesquioxane polymer, designated herein as SSQ-13 (Formula (I), $L^1$=$L^2$=single bond; $R^1$=$R^2$=methyl; $R^3$=C18 alkyl; $R^4$=—$(CH_2)_3NH_2$; m and n not determined). Contact angles were measured and are reported in Table 4 below.

Example 14 (SSQ-1 Emulsion)

Thirty (30) grams of SSQ-1 (Example 1) were dissolved in 45 grams of ethylacetate at 65° C. in a 250-milliliter three-neck round-bottomed flask. To this was added a solution containing 90 grams of deionized water, 0.8 gram ETHOQUAD C-12, 1.8 grams TERGITOL TMN-6, and 0.9 gram of TERGITOL 15-S-30, also at 65° C. The mixture was stirred for 15 minutes at 65° C., and then was homogenized by passing the mixture two times through a homogenizer (Model HC8000, Microfluidics Corp., Westwood, Mass.), at 65° C. Ethyl acetate was then removed by vacuum distillation at 40° C. The solids content of the obtained SSQ-1 Emulsion was 25.0%.

Treatment baths were prepared by diluting 9.53 grams of the SSQ-1 Emulsion with 90.47 grams of deionized water. Treatments were applied to nylon (NTD) and polyester (PPP) fabric substrates according to the Treatment Procedure via "Padding" Process to provide a concentration as indicated in Table 3 (based on fabric weight and indicated as SOF (solids on fabric)). The samples were then dried and cured (150-170° C. for 1-5 minutes). After drying and heat curing, the treated fabrics were tested for their dynamic water repellent properties using the Spray Rating (SR) test described herein.

Example 15 (SSQ-3 Emulsion)

Thirty (30) grams of SSQ-3 (Example 3) were dissolved in 70 grams of methyl isobutyl ketone (MIBK) at 65° C. in a 500-milliliter three-neck round-bottomed flask. To this was added a solution containing 130 grams of DI water, 1.2 grams ETHOQUAD C-12, 1.8 grams TERGITOL TMN-6, and 0.9 gram of TERGITOL 15-S-30, also at 65° C. The mixture was vigorously stirred for 15 minutes at 65° C., and then was then homogenized by passing the mixture two times through a homogenizer (Model HC8000, Microfluidics Corp., Westwood, Mass.), at 65° C. MIBK was then removed by vacuum distillation at 40° C. The solids content of the obtained SSQ-3 emulsion was 19.2%.

Treatment baths were prepared by diluting 7.44 grams of the SSQ-3 Emulsion with 92.56 grams of deionized water. Treatments were applied to nylon (NTD) and polyester (PPP) fabric substrates according to the Treatment Procedure via "Padding" Process to provide a concentration as indicated in Table 3 (based on fabric weight and indicated as SOF (solids on fabric)). The samples were then dried and cured (150-170° C. for 1-5 minutes). After drying and heat curing, the treated fabrics were tested for their dynamic water repellent properties using the Spray Rating (SR) test described herein.

The Spray Rating data for Examples 14 and 15 are reported in Table 3. Initial Spray Rating is reported. Untreated nylon fabric (NTD) and untreated polyester fabric (PPP) samples were also tested for comparison.

TABLE 3

|  | % SOF | Spray Rating |
|---|---|---|
| PPP treated with Example 14-SSQ-1 emulsion (73% WPU) | 1 | 80 |
| NTD treated with Example 14-SSQ-1 emulsion (66% WPU) | 1 | 80 |
| PPP treated with Example 15-SSQ-3 emulsion (73% WPU) | 1 | 50 |
| NTD treated with Example 15-SSQ-3 emulsion (66% WPU) | 1 | 50 |
| Untreated NTD | 0 | 0 |
| Untreated PPP | 0 | 0 |

Comparative Examples

Comparative Examples 1-5

Comparative Examples 1-5 were, in order: octadecane, hexadecane, hexacosane, dodecane, and octadecanol. These were evaluated for their contact angles as described in test method "Contact Angle" above. The results are reported in Table 4 below.

Comparative Example 6 (Methyl SSQ)

Methyl silsesquioxane polymer was prepared in the same manner as Example 1 (SSQ-1) with the following modification: methyl-trimethoxysilane, 100 grams, was used in place of octadecyltrimethoxysilane to provide 85 grams (85% yield) of a viscous liquid, methyl silsesquioxane, designated herein as Methyl SSQ. Contact angles were measured and are reported in Table 4 below.

Comparative Example 7 (Ethyl SSQ)

Ethyl silsesquioxane polymer was prepared in the same manner as Example 1 (SSQ-1) with the following modification: ethyl-trimethoxysilane, 100 grams, was used in place of octadecyltrimethoxysilane to provide 85 grams (85% yield) of a viscous liquid, ethyl silsesquioxane, designated herein as Ethyl SSQ. Contact angles were measured and are reported in Table 4 below.

Comparative Example 8 (n-Octyl SSQ)

n-Octylsilsesquioxane polymer was prepared in the same manner as Example 1 (SSQ-1) with the following modification: n-octyltrimethoxysilane, 100 grams, was used in place of octadecyl-trimethoxysilane to provide 85 grams (85% yield) of a viscous liquid, n-octyl silsesquioxane, designated herein as n-Octyl SSQ. Contact angles were measured and are reported in Table 4 below.

Comparative Example 9 (Dodecyl SSQ)

Dodecyl silsesquioxane polymer was prepared in the same manner as Example 1 (SSQ-1) with the following modification: dodecyltrimethoxysilane, 100 grams, was used in place of octadecyl-trimethoxysilane to provide 90 grams (90% yield) of a white waxy solid, dodecyl silsesquioxane, designated as SSQ-3. Contact angles measured and are reported in Table 4 below.

TABLE 4

| Example | Material | Contact Angle (degrees) |
|---|---|---|
| Comparative 1 | Octadecane | 92.4 |
| Comparative 2 | Hexadecane | 90.0 |
| Comparative 3 | Hexacosane | 93.1 |
| Comparative 4 | Dodecane | 89.3 |
| Comparative 5 | Octadecanol | 90.0 |
| Comparative 6 | Methyl SSQ | 80.0 |
| Comparative 7 | Ethyl SSQ | 82.4 |
| Comparative 8 | n-Octyl SSQ | 85.3 |
| Comparative 9 | Dodecyl SSQ | 95.0 |
| 1 | SSQ-1 | 105.5 |
| 2 | SSQ-2 | 104.3 |
| 3 | SSQ-3 | 105.0 |
| 4 | SSQ-4 | 105.0 |
| 5 | SSQ-5 | 103.5 |
| 6 | SSQ-6 | 110.4 |
| 7 | SSQ-7 | 104.2 |
| 8 | SSQ-8 | 104.7 |
| 9 | SSQ-9 | 101.0 |
| 10 | SSQ-10 | 103.0 |
| 11 | SSQ-11 | 102.8 |
| 12 | SSQ-12 | 101.0 |
| 13 | SSQ-13 | 101.3 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A silsesquioxane polymer comprising a three-dimensional network of Formula (I):

wherein:
each $R^1$ and $R^2$ is independently a (C1-C4)alkyl;
each $L^1$ and $L^2$ is independently a single bond, an alkylene, or an alkylene bonded to a group selected from oxy, thio, carbonyl, —NH—, and combinations thereof;
each $R^3$ is independently a linear (C14-C100)alkyl;
each $R^4$ is independently a (C1-C30)alkyl, a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group;
with the proviso that $L^1$, $L^2$, and $R^4$ are selected such that each Si atom is directly bonded to an alkylene or an alkyl;
m is an integer of at least 2;
n is an integer of 0 or above;
m+n is an integer of at least 3;
each oxygen atom at an asterisk (*) is bonded to another Si atom within the three-dimensional network; and
the silsesquioxane polymer is a solid at 25° C.

2. The silsesquioxane polymer of claim 1 wherein m÷(m+n) is at least 0.50.

3. The silsesquioxane polymer of claim 1 wherein m÷(m+n) is at least 0.90.

4. The silsesquioxane polymer of claim 1 wherein each $R^3$ is independently a linear (C14-C60)alkyl.

5. The silsesquioxane polymer of claim 4 wherein each $R^3$ is independently a linear (C18-C30)alkyl.

6. The silsesquioxane polymer of claim 1 wherein each $L^1$ is a single bond.

7. The silsesquioxane polymer of claim 1 wherein at least a portion of the $L^1$ groups are single bonds, and at least a portion of the $L^1$ groups are an alkylene bonded to a group selected from oxy, thio, carbonyl, —NH—, and combinations thereof.

8. The silsesquioxane polymer of claim 1 wherein each $L^2$ is a single bond.

9. The silsesquioxane polymer of claim 1 wherein at least a portion of the $L^2$ groups are single bonds, and at least a portion of the $L^2$ groups are an alkylene bonded to a group selected from oxy, thio, carbonyl, —NH—, and combinations thereof.

10. The silsesquioxane polymer of claim 1 wherein each $R^4$ is independently a (C1-C30)alkyl.

11. The silsesquioxane polymer of claim 1 wherein each $R^4$ is independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

12. The silsesquioxane polymer of claim 1 wherein at least a portion of the $R^4$ groups are independently a (C1-C30)alkyl, and at least a portion of the $R^4$ groups are independently a (C2-C30)heteroalkyl having at least one oxygen, sulfur, or —NH— group, or a (C1-C30)alkyl substituted with a fluoro, thiol, isocyanato, cyanato, hydroxyl, glycidoxy, or epoxy group.

13. The silsesquioxane polymer of claim 1 wherein each $R^1$ and $R^2$ is a methyl group.

14. The silsesquioxane polymer of claim 1 wherein n=0.

15. The silsesquioxane polymer of claim 1 wherein m+n is an integer of at least 25.

16. The silsesquioxane polymer of claim 1 wherein m+n is an integer of up to 600.

17. An article comprising:
a substrate; and
a hydrophobic layer comprising a silsesquioxane polymer of claim 1 adjacent to the substrate.

18. A treating composition comprising water and a silsesquioxane polymer of claim 1.

19. A method of treating a fibrous substrate comprising applying to the fibrous substrate a treating composition of claim 18 in an amount sufficient to make the fibrous substrate water repellent.

20. A fibrous substrate treated by the method of claim 19.

* * * * *

UNITED STATES PATENT AND TRADEMARK OFFICE
CERTIFICATE OF CORRECTION

PATENT NO. : 10,889,691 B2
APPLICATION NO. : 16/640998
DATED : January 12, 2021
INVENTOR(S) : Jitendra Rathore et al.

It is certified that error appears in the above-identified patent and that said Letters Patent is hereby corrected as shown below:

On the Title Page

Column 2
Item (57) Abstract, Line 5, After "independently" delete "in".
Item (57) Abstract, Line 9, After "alkyl," insert -- a --.
Item (57) Abstract, Line 14, Delete "3;" and insert -- 2; --, therefor.

In the Specification

Column 1
Line 6, Delete "APPLICATION" and insert -- APPLICATIONS --, therefor.
Line 9, Delete "pf" and insert -- of --, therefor.
Line 39, After "Formula" insert -- (I): --.

Column 5
Line 32, Delete "Examples 6-9)." and insert the same on Column 5, Line 31 as a continuation of the same paragraph.

Column 6
Line 2, Delete "theL$^1$" and insert -- the L$^1$ --, therefor.

Column 12
Line 40, Delete "SID4635.0from" and insert -- SID4635.0 from --, therefor.

In the Claims

Column 21
Line 43-44, In Claim 2, delete "m (m+n)" and insert -- m÷(m+n) --, therefor.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*